United States Patent Office 3,205,044
Patented Sept. 7, 1965

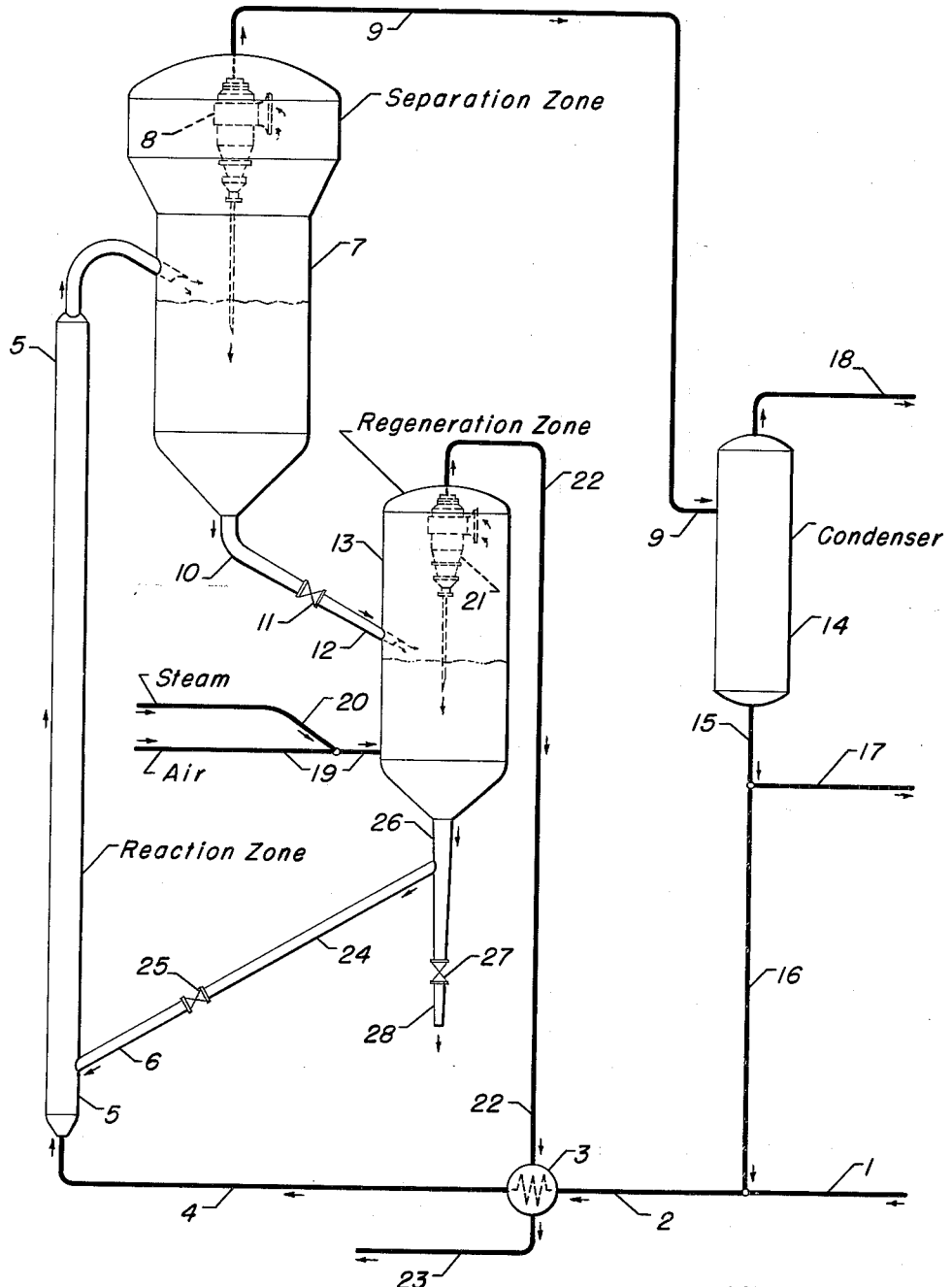
Sept. 7, 1965     C. V. BERGER     3,205,044
PRODUCTION OF HYDROGEN
Filed July 28, 1961
INVENTOR:
Charles V. Berger
BY: Chester J. Giuliani
James R. Hoatson Jr.
ATTORNEYS.

3,205,044
PRODUCTION OF HYDROGEN
Charles V. Berger, Western Springs, Ill., assignor to Universal Oil Products Company, Des Plaines, Ill., a corporation of Delaware
Filed July 28, 1961, Ser. No. 127,559
4 Claims. (Cl. 23—212)

This invention relates to a continuous process for the preparation of hydrogen, and in particular to a continuous process for the catalytic coking of a hydrocarbon oil in a fluidized solids system to produce hydrogen.

Catalytic hydrogenation has found extensive application in a number of industrial processes. For example, large quantities of hydrogen are consumed in the manufacture of a variety of highly useful materials such as ammonia, methanol, liquid fuels, hydrogenated vegetable oils, and a number of organic chemicals. Further, the demand for hydrogen in the processing of petroleum is constantly increasing and it may be anticipated that in the future additional quantities will be demanded for the hydrogenation of coal to produce fuels and chemicals.

The further development and operation of the aforesaid processes is of course dependent on an adequate source of hydrogen. Hydrocarbon oils and gases, readily and extensively available as a result of petroleum processing, are an excellent source of hydrogen and a number of processes have been proposed for the conversion thereof to hydrogen. Processes based on a fluidized solids system wherein the solids act as a catalyst as well as a heat transfer media, in particular, the cracking or coking of hydrocarbons to form hydrogen and coke in a fluidized solid system, hold great potential. Normally gaseous hydrocarbons, and in particular methane, because of the high hydrogen content as well as the abundance thereof, is considered to be an especially attractive source of hydrogen. However, the cracking of such hydrocarbons to effect substantially complete conversion thereof to hydrogen and coke, is a highly endothermic reaction. For example, the complete conversion of methane to hydrogen and carbon requires about 2400 B.t.u./lb. of methane. To supply an endothermic heat of reaction of this magnitude requires the maintenance of a high ratio of hot fluidized solids to hydrocarbon charge in the reaction zone. This in turn necessitates continuous circulation of an extremely large volume of hot fluidized solids through said reaction zone to maintain the high ratio of solids to hydrocarbon therein. The practical effect of circulating such large quantities of fluidized solids is excessive solids attrition and resultant catalyst loss as well as undue erosion of plant equipment.

It is an object of this invention to present a novel process for the production of hydrogen by the catalytic coking of hydrocarbons.

It is a further object of this invention to present a novel process for the catalytic coking of a hydrocarbon oil in a fluidized solids system to produce hydrogen, which process substantially reduces catalyst attrition as well as plant erosion.

In one of its broader aspects the present invention embodies a process for the production of hydrogen which comprises contacting a hydrocarbon oil with hot catalytic particles comprising coke and an iron group metal and forming vapors comprising a hydrocarbon conversion product rich in hydrogen, and catalytic particles of increased carbon content, separating the vapors from the catalytic particles of increased carbon content, recovering the hydrogen from the hydrogen-rich vapors, heating the last mentioned catalytic particles by burning a portion of the carbon therefrom in the presence of a gaseous mixture comprising an oxygen-containing gas and returning the hot catalytic particles into contact with further quantities of the aforesaid hydrocarbon oil.

A further embodiment is in a process for the production of hydrogen which comprises contacting a hydrocarbon oil containing not more than about 14% hydrogen and having a specific gravity of at least about .85 with hot catalytic particles comprising coke and an iron group metal at a temperature of from about 1300° F. to about 1600° F. and forming catalytic particles of increased carbon content and vapors comprising hydrocarbon conversion products rich in hydrogen, separating the vapors from the catalytic particles of increased carbon content, recovering the hydrogen from the hydrogen-rich vapors, heating the last mentioned catalytic particles to a temperature of from about 1400° F. to about 1700° F. by burning a portion of the carbon therefrom in the presence of a gaseous mixture comprising air and steam and returning the hot catalytic particles into contact with further quantities of the aforesaid hydrocarbon oil.

A more specific embodiment is in a process for the production of hydrogen which comprises contacting a catalytic cycle stock comprising from about $$\left(9 + \frac{\text{bromine number}}{75}\right) \text{ wt. percent}$$

hydrogen to about $$\left(12 + \frac{\text{bromine number}}{75}\right) \text{ wt. percent}$$

hydrogen with hot catalytic particles comprising from about .05 wt. percent to about 10 wt. percent nickel and an activated coke in a reaction zone at a temperature of from about 1300° F. to about 1600° F. and forming catalytic particles of increased carbon content and vapors comprising a hydrocarbon conversion product rich in hydrogen, separating the vapors from the catalytic particles of increased carbon content in a separation zone, withdrawing the hydrogen-rich vapors from said separation zone and recovering the hydrogen from said vapors, recycling at least a portion of the hydrocarbon fraction of said vapors to the aforesaid reaction zone, passing the last mentioned catalytic particles to a regeneration zone and heating said particles therein to a temperature of from about 1400° F. to about 1700° F. by burning a portion of the carbon therefrom in the presence of a gaseous mixture comprising air and steam, and returning the hot catalytic particles from the regeneration zone into contact with further quantities of the aforesaid hydrocarbon oil in the reaction zone.

Other objects and embodiments of the present invention will become apparent in the following detailed description thereof.

In accordance with the process of this invention hydrogen is produced by the conversion of a hydrocarbon oil in the presence of a catalytic coke. The hydrocarbon oil is preferably one comprising hydrocarbons of a low heat of formation. Since the heat of formation is low the rate of transfer of hot fluidized solids from the regeneration zone through the reaction zone is correspondingly low. The hydrocarbon oils which are utilized in the present process are characterized by a comparatively low heat of formation which varies about a neutral point by about ±500 B.t.u./lb. Generally, hydrocarbon oils comprising less than about 14 wt. percent hydrogen and having a specific gravity of at least 0.85 fall within this description. It is of course desirable to utilize as a hydrocarbon oil one whose heat of formation lies within the desired range and comprises an optimum amount of hydrogen. The wt. percent hydrogen increases with increased unsaturation at a given heat of formation. Thus it is possible to select a preferred hydrocarbon oil charge of optimum hydrogen content by measuring the degree of unsaturation of the charge stock, for example, by the bromine number method. It is preferred to utilize a hydrocarbon oil wherein the hydrogen comprises from about $$\left(9 + \frac{\text{bromine number}}{75}\right) \text{ wt. percent}$$

to about $$\left(12 + \frac{\text{bromine number}}{75}\right) \text{ wt. percent}$$

The bromine number is defined as the number of grams of bromine consumed by 100 grams of sample. The abundant and readily available catalytic cycle stocks are particularly suitable for the process of this invention.

The conversion of hydrocarbon oils in accordance with the present process is in the presence of a catalyst herein referred to as a catalytic coke. The catalytic coke comprises particles of activated coke having deposited thereon an iron group metal, i.e., iron, nickel or cobalt. The initial charge of catalytic coke may be catalytic coke from a prior run, or it may be prepared from a readily available commercial coke such as that prepared by the destructive distillation of wood, lignite, peat, coal, petroleum oils, etc. The coke can be activated separately prior to use, or in the practice of this invention as will hereinafter appear, by treatment with air, oxides of carbon, chlorine, superheated steam, or mixtures of steam and air at temperatures ranging from about 1200° F. to about 1700° F. The iron group metal may be deposited on the activated cake, by soaking, dipping, or otherwise immersing the coke particles in an aqueous solution of a soluble compound of iron, nickel or cobalt including nickel chloride, nickel sulfate, nickel formate, nickel acetate, nickel nitrate, cobalt chloride, cobalt sulfate, cobalt nitrate, cobalt acetate, cobalt formate, ferric chloride, ferric sulfate, ferric nitrate, ferric acetate, ferric formate, etc. The iron group metal may comprise only a trace amount of said catalytic coke particles, say about .05 wt. percent although it is preferred to employ larger amounts up to about 10 wt. percent.

After the initial charge of catalytic coke it may be necessary from time to time to add additional amounts of the iron group metal thereto. This may be readily accomplished, for example, by adding the desired amounts of said metals or compounds thereof to the hydrocarbon oil charge to be sorbed or otherwise deposited on the catalytic coke particles as they pass through the reaction zone in contact with said hydrocarbon oil charge. However, after the initial charge of catalyst it is unnecessary to charge additional quantities of activated coke particles to the process since a sufficient portion of the coke, deposited on the catalytic coke particles during the course of the reaction, is activated during the regeneration process to replace any activated coke loss through attrition or other causes. At least a portion of the remaining coke is utilized to generate heat for the process as will hereinafter appear.

The further description of the process of this invention is presented with reference to the accompanying drawing which is merely schematic and for purposes of illustration. It is understood that many modifications and variations may be made thereto without departing from the generally broad scope of this invention as set out in the appended claims. Referring then to the drawing, the hydrocarbon oil is charged to the process through line 1, entering a heat exchanger 3 through line 2. The hydrocarbon oil is thus preheated to a temperature of about 550° F. or more and introduced to a reaction zone 5 though line 4. The hydrocarbon oil is commingled with hot catalytic coke particles admitted to the reaction zone from a conduit 6 and thereby substantially completely vaporized. The hot catalytic coke particles serve to maintain the reaction zone at a temperature of from about 1300° F. to about 1600° F. and act as a catalyst for the catalytic conversion of the hydrocarbon oil to coke and a vapor stream comprising hydrocarbon conversion products rich in hydrogen. Operating pressures are low, generally less than about 75 p.s.i. The reaction zone is preferably maintained at a pressure of from about atmospheric to about 50 p.s.i.

The coke which forms during the course of the reaction increases the carbon content of the aforesaid catalytic coke particles as they pass through the reaction zone and catalytic coke particles of increased carbon content are discharged into a separation zone 7 together with the hydrocarbon conversion products. Vapors comprising the hydrogen-rich hydrocarbon conversion products accumulate in the upper portion of said separation zone 7 and are withdrawn therefrom through a particle separator 8, passing by way of line 9 to a condenser 14 wherein the condensable products are separated from the non-condensable products. The non-condensable products, containing a high concentration of hydrogen, are withdrawn overhead through line 18 and passed to a conventional or otherwise suitable hydrogen recovery and purification means (not shown).

The condensable portion of the hydrocarbon conversion products, withdrawn from the condenser 14 through line 15, can be recovered from the process through line 17 although it is preferred to recycle at least a portion thereof, which may be selected by fractionation, to the reaction zone 5 by passing it through line 16 to combine with the hydrocarbon oil charged to the process through line 1. Unconverted gaseous hydrocarbons may also be recycled if desired.

The catalytic coke particles of increased carbon content, discharged into the lower portion of the separation zone 13, pass downwardly therethrough and exit by means of a conduit 10, a control valve 11, and enter a regeneration zone 13 through a conduit 12. The coke particles are heated in said regeneration zone to a temperature of from about 1400° F. to about 1700° F. on contact with a gaseous mixture comprising air or other oxygen-containing gas introduced through line 19. The amount of carbon burned in the regeneration zone 13 is preferably substantially equivalent to the amount formed in the reaction zone 5 so that the carbon content of the catalytic coke particles remains substantially constant. Temperatures resulting from the combustion of carbon in the regeneration zone can be maintained within the desired limits by the inclusion of steam in the aforesaid gaseous mixture to react endothermically with at least a portion of the excess carbon, the ratio of steam to air (or other oxygen-containing gas) in said gaseous mixture being dependent on the temperature existing in the regeneration zone at any particular time. Also the endothermic reaction of steam and carbon produces a valuable hydrogen-carbon monoxide rich gas suitable for use as a gaseous fuel of high heat content. The presence of steam in the regeneration zone at the temperatures maintained therein also establishes conditions suitable for the formation of the desired activated coke particles. An alternative, although less desirable, method of temperature control comprises burning a quantity of carbon in the presence of air as meets the heat requirements of the system and discharging the excess carbon in the form of coke from the process by way of conduit 26, control valve 27, and outlet 28. The first mentioned method of temperature control is preferred since by contacting the coke particles with steam the coke is thereby activated and the activity of the catalytic coke thereby enhanced. Also, it is preferred to retain the catalytic coke in the system rather than withdraw portions thereof solely for temperature control. Regardless of the method utilized, the hot catalytic coke particles are withdrawn from the regeneration zone 13 through a conduit 26 and a conduit 24, passing through a control valve 25, a conduit 6 and entering the reaction zone 5 to be admixed with the preheated hydrocarbon oil charge introduced thereto through line 4.

The hot, gaseous combustion products from the regeneration zone pass overhead through a particle separator 21 and line 22 to a heat exchanger 3 and are thereafter discharged from the process through line 23.

Thus, good yields of hydrogen are produced in a fluidized solids system in a manner whereby catalyst attrition and plant erosion are substantially minimized. Utilization of the preferred hydrocarbon oil feed stocks of low heat of formation require a comparatively moderate rate of transfer of the catalytic coke particles to maintain the heat requirements of the system. The result of a moderate transfer rate is reduced plant erosion. In addition, the present process substantially reduces the adverse effects resulting from catalytic attrition by manufacturing its own activated coke.

I claim as my invention:

1. A process for the production of hydrogen which comprises contacting a hydrocarbon oil containing not more than about 14% hydrogen and having a specific gravity of at least about .85 with hot catalytic particles consisting essentially of coke having a deposit of from about 0.05% to about 10% by weight of an iron group metal and forming vapors comprising hydrocarbon conversion products rich in hydrogen and catalytic particles of increased carbon content, separating the vapors from the catalytic particles of increased carbon content, recovering the hydrogen from the hydrogen-rich vapors, heating the last mentioned catalytic particles by burning a portion of the carbon therefrom in the presence of a gaseous mixture comprising an oxygen-containing gas and returning the hot catalytic particles into contact with further quantities of the aforesaid hydrocarbon oil.

2. A process for the production of hydrogen which comprises contacting a hydrocarbon oil containing not more than about 14% hydrogen and having a specific gravity of at least about .85 with hot catalytic particles consisting essentially of coke having a deposit of from about 0.05% to about 10% by weight of an iron group metal at a temperature of from about 1300° F. to about 1600° F. and forming catalytic particles of increased carbon content and vapors comprising hydrocarbon conversion products rich in hydrogen, separating the vapors from the catalytic particles of increased carbon content, recovering the hydrogen from the hydrogen-rich vapors, heating the last mentioned catalytic particles to a temperature of from about 1400° F. to about 1700° F. by burning a portion of the coke therefrom in the presence of a gaseous mixture comprising an oxygen-containing gas and returning the hot catlytic particles into contact with further quantities of the aforesaid hydrocarbon oil.

3. A process for the productionof hydrogen which comprises contacting a hydrocarbon oil comprising from about $$\left(9+\frac{\text{bromine number}}{75}\right) \text{wt. percent}$$

to about $$\left(12+\frac{\text{bromine number}}{75}\right) \text{wt. percent}$$

hydrogen with hot catalytic particles consisting essentially of coke having a deposit of from about 0.05% to about 10% by weight of an iron group metal at a temperature of from about 1300° F. to about 1600° F. and forming catalytic particles of increased carbon content and vapors comprising hydrocarbon conversion products rich in hydrogen, separating the vapors from the catalytic particles of increased carbon content, recovering the hydrogen from the hydrogen-rich vapors, heating the last mentioned catalytic particles to a temperature of from about 1400° F. to about 1700° F. by burning a portion of the carbon therefrom in the presence of a gaseous mixture comprising air and returning the hot catalytic particles into contact with further quantities of the aforesaid hydrocarbon oil.

4. A process for the produtcion of hydrogen which comprises contacting a catalytic cycle stock comprising from about $$\left(9+\frac{\text{bromine number}}{75}\right) \text{wt. percent}$$

hydrogen to about $$\left(12+\frac{\text{bromine number}}{75}\right) \text{wt. percent}$$

hydrogen with hot catalytic particles consisting essentially of from about .05 wt. percent to about 10 wt. percent nickel deposited on an activated coke in a reaction zone at a temperature of from about 1300° F. to about 1600° F. and forming catalytic particles of increased carbon content and vapors comprising a hydrocarbon conversion product rich in hydrogen, separating the vapors from the catalytic particles of increased carbon content in a separation zone, withdrawing the hydrogen-rich vapors from said separation zone and recovering the hydrogen from said vapors, recycling at least a portion of the hydrocarbon fraction of said vapors to the aforesaid reaction zone, passing the last mentioned catalytic particles to a regeneration zone and heating said particles therein to a temperature of from about 1400° F. to about 1700° F. by burning a portion of the carbon therefrom in the presence of a gaseous mixture comprising air and steam, and returning the hot catalytic particles from the regeneration zone into contact with further quantities of the aforesaid hydrocarbon oil in the reaction zone.

References Cited by the Examiner

UNITED STATES PATENTS

| | | | |
|---|---|---|---|
| 2,647,041 | 7/53 | Robinson | 23—212 |
| 2,690,963 | 10/54 | Herbst | 48—196 |
| 2,756,189 | 7/56 | Scharmann et al. | 252—417 |
| 2,805,177 | 9/57 | Krebs | 23—212 |
| 2,971,823 | 2/61 | Jahrig et al. | 23—212 |
| 2,985,512 | 5/61 | Arey | 23—212 |
| 3,057,689 | 10/62 | McEvoy et al. | 23—212 |

MAURICE A. BRINDISI, *Primary Examiner.*